United States Patent
Dichand

(10) Patent No.: US 10,144,642 B2
(45) Date of Patent: Dec. 4, 2018

(54) METHOD FOR COOLING A HOT SYNTHESIS GAS

(71) Applicant: Gussing Renewable Energy International Holding GmbH, Vienna (AT)

(72) Inventor: Michael Dichand, Nussdorf am Attersee (AT)

(73) Assignee: Gussing Renewable Energy International Holding GmbH, Vienna (AT)

( * ) Notice: Subject to any disclaimer, the term of this patent is extended or adjusted under 35 U.S.C. 154(b) by 0 days.

(21) Appl. No.: 15/560,766

(22) PCT Filed: Mar. 24, 2016

(86) PCT No.: PCT/AT2016/000029
§ 371 (c)(1),
(2) Date: Sep. 22, 2017

(87) PCT Pub. No.: WO2016/149716
PCT Pub. Date: Sep. 29, 2016

(65) Prior Publication Data
US 2018/0050910 A1  Feb. 22, 2018

(30) Foreign Application Priority Data

Mar. 24, 2015 (AT) ..................... 170/2015

(51) Int. Cl.
*C01B 3/52* (2006.01)
*C10K 1/04* (2006.01)
(Continued)

(52) U.S. Cl.
CPC ............ *C01B 3/54* (2013.01); *B01D 53/1431* (2013.01); *C01B 3/52* (2013.01); *C10K 1/046* (2013.01);
(Continued)

(58) Field of Classification Search
None
See application file for complete search history.

(56) References Cited

U.S. PATENT DOCUMENTS 4,512,777 A * 4/1985 Wild ..................... C01B 3/50
                                                      48/210
2004/0107835 A1 * 6/2004 Malatak ............. B01D 53/14
                                                     95/196
(Continued)

FOREIGN PATENT DOCUMENTS

AT         405 937 B    12/1999
GB         1326455 A    8/1973
(Continued)

OTHER PUBLICATIONS

International Preliminary Examination Report (English translation) for PCT/AT2016/000029 dated Sep. 29, 2017 re PCT amended claims 1-8.
(Continued)

*Primary Examiner* — Duane Smith
*Assistant Examiner* — Phillip Y Shao
(74) *Attorney, Agent, or Firm* — Fitch, Even, Tabin & Flannery LLP

(57) ABSTRACT

In a method for cooling a hot synthesis gas containing at least one condensable constituent part, in particular tar, during which the synthesis gas in a multi-stage cooling process passes through a first cooling stage, a second cooling stage and a third cooling stage one after the other and the synthesis gas after an at least partial cooling is at least subjected to a separation step for separating the at least one condensable constituent part, the synthesis gas is cooled in the first cooling stage to a temperature above the condensation temperature of the at least one condensable constituent part and the second cooling stage comprises the recir-
(Continued)

culating of a part quantity of synthesis gas branched off after the third cooling stage and the at least one separation step into the synthesis gas flow.

14 Claims, 2 Drawing Sheets

(51) Int. Cl.
  *C01B 3/54* (2006.01)
  *B01D 53/14* (2006.01)
(52) U.S. Cl.
  CPC . *C01B 2203/048* (2013.01); *C10J 2300/1823* (2013.01)

(56) References Cited

U.S. PATENT DOCUMENTS

| | | | | |
|---|---|---|---|---|
| 2005/0095183 A1* | 5/2005 | Rehmat | ................... | C01B 3/382 422/600 |
| 2010/0043291 A1* | 2/2010 | Ljunggren | .............. | C10B 53/02 48/197 FM |
| 2012/0121492 A1* | 5/2012 | Schaub | .................. | C10K 1/165 423/242.1 |
| 2012/0227683 A1* | 9/2012 | Scott | ...................... | C10K 1/046 123/3 |
| 2013/0109765 A1 | 5/2013 | Jiang et al. | | |

FOREIGN PATENT DOCUMENTS

| | | |
|---|---|---|
| WO | 2013/062800 A1 | 5/2013 |
| WO | 2013/068643 A1 | 5/2013 |

OTHER PUBLICATIONS

International Search Report for PCT/AT2016/000029 dated Aug. 22, 2016; English translation submitted herewith (5 pages).
International Preliminary Examination Report for PCT/AT2016/000029 dated Aug. 22, 2016 re original PCT claims 1-14.
International Preliminary Examination Report for PCT/AT2016/000029 dated Aug. 1, 2017 re PCT amended claims 1-8.

* cited by examiner

METHOD FOR COOLING A HOT SYNTHESIS GAS

CROSS-REFERENCE TO RELATED APPLICATIONS

This application is a U.S. national phase application filed under 35 U.S.C. § 371 of International Application No. PCT/AT2016/000029, filed Mar. 24, 2016, designating the United States, and claims priority from Austrian Patent Application No. A 170/2015, filed Mar. 24, 2015, and the complete disclosures of which applications are hereby incorporated herein by reference in their entirety for all purposes.

The invention relates to a method for cooling a hot synthesis gas containing at least one condensable constituent part, in particular tar, in which the synthesis gas in a multi-step cooling process passes through a first cooling stage, a second cooling stage and a third cooling stage one after the other and the synthesis gas after an at least partial cooling is subjected to at least one separation step for separating the at least one condensable constituent part.

The invention, furthermore, relates to a device for carrying out such a method.

The invention, in particular, relates to the cooling of synthesis gas, which is produced in a gasification plant using biomass. Synthesis gas is generally understood to be a gas the main constituent parts of which are CO and $H_2$.

In particular, the synthesis gas to be cooled according to the invention originates from a gasification plant comprising a gasification zone for receiving a stationary fluidized bed and a combustion zone for receiving a transporting fluidized bed, wherein the gasification zone and the combustion zone are connected to one another at two places in each case by way of a lock-like device, such as a constriction or a siphon for making possible a circulating of the bed material, wherein the gasification zone has a charge opening for charging combustion material, a gas discharge and a nozzle base for injecting in particular steam or $CO_2$ and the combustion zone has an air supply for fluidising the bed material entering the combustion zone from the gasification zone.

A gasification plant of this type has become known from the Patent Publication AT 405 937 B. Such a gasification plant can be used in order to recycle heterogeneous, biogenic fuels and plastics and extract from these as nitrogen-free combustion gas with high calorific value as possible or synthesis gas, which is suitable for power generation or for the synthesis of organic products. The procedure here is that the fuel is introduced into a gasification zone formed as stationary fluidized bed, which is fluidised by steam and/or $CO_2$, and is degasified under air exclusion and partially gasified by way of reaction with the fluidising gases or the gasification means (steam and/or $CO_2$) and with the help of the heat of the bed material. The product gas rising in the process is extracted and the cooled bed material with the non-gasified residual fuel enters the combustion zone via lock-like devices such as for example a constriction. In the combustion zone, the bed material with the residual fuel is fluidized by air while forming a rapidly circulating fluidized bed and the residual fuel is combusted. Following the separation of combustion waste gas in a cyclone, the bed material is charged via lock-type devices, such as for example a siphon, onto the stationary fluidized layer of the gasification zone.

By using a catalytically acting bed material, in particular on a nickel and/or niobium base, the gas formed during the degasification and gasification can be refined in that practically only CO, $CO_2$ and $H_2$ as combustible constituent parts, as well as steam are now present or a methane-rich gas with high calorific value is created.

The synthesis gas leaving the gasification plant generally has a temperature of 600-800° C. and contains solid, dust-like constituent parts and condensable constituent parts, such as in particular tar. The synthesis gas therefore has to be subjected to a cooling and a cleaning. Mostly the procedure here is that the synthesis gas is initially cooled in a cooling device so far that the dust-like constituent parts can be separated in a filter, in particular fabric filter. The tar contaminations are removed in a downstream gas scrubber and the cleaned, cooled synthesis gas, following compression by means of blowers, can be directly converted into electricity in a gas engine.

During the cooling of the synthesis gas containing the condensable constituent parts, in particular tar, a problem arises in that the condensable constituent parts condense and settle on the cooling device, in particular the respective heat exchanger clogging the same after some time, which leads to a stoppage of the plant. In the case of tar, condensing at temperatures of 200-500° C. can be observed. However, the synthesis gas is advantageously already cooled before the separation step to a temperature level below 200° C., since such a low temperature level within the scope of the separation step allows the use of standard filters for separating solid constituent parts, wherein such filters are available at lower costs than special filters for high-temperature applications. In addition, lower temperatures result in a lowering of the synthesis gas volume, as a result of which the required filter surface area drops which likewise leads to cost savings.

Here, the cooling mostly takes place in a plurality of consecutive stages in order to keep the length of the individual heat exchanger stages within justifiable limits and also optimally adjust the speed in the individual stages. In the end region of the last heat exchanger before the separation stage, a settling of the condensate can be observed during a cooling below the condensation temperature of the at least one condensable constituent part.

There is thus the object of creating a method and a device for cooling synthesis gas with which a cooling of the synthesis gas before the separation step to temperatures below the condensation temperature is possible without condensate which is produced in the process causing the plant to be detrimentally affected.

For solving this object, the invention substantially provides with a method of the type mentioned at the outset that the synthesis gas is cooled down in the first cooling stage to a temperature above the condensation temperature of the at least one condensable constituent part and the second cooling stage comprises the recirculation of a part quantity of synthesis gas branched off after the third cooling stage and after the at least one separation step into the synthesis gas flow.

The cooling stages are thus configured so that the synthesis gas in the first cooling stage merely cools down to a temperature above the condensation temperature of the at least one condensable constituent part, so that a condensation of for example tar in this stage is securely avoided. In this cooling stage, conventional heat exchangers can thus be used. In this connection, the invention is preferably further developed in such a manner that the synthesis gas flow in the first cooling stage is conducted through at least one, preferably two heat exchangers connected in series. Particularly preferably, cost-effective heat exchangers of simple construction such as for example a tubular fume cooler can be employed particularly preferably in the first cooling stage. In a tubular fume cooler, a preferably vertically standing fume tube is enclosed by a cooling jacket. While the synthesis gas to be cooled is conducted through the fume tube, the cooling jacket is flowed through by a cooling medium such as water, which is heated on the fume tube.

A further cooling of the synthesis gas, in particular such cooling to below the condensation temperature of the at least one condensable constituent part according to the invention does not now take place in a further heat exchanger but by admixing cold synthesis gas to the main flow of the synthesis gas, as a result of which a quenching of the synthesis gas is achieved. In the process, the cold synthesis gas is branched off after the third cooling stage and after the at least one separation step and is therefore largely free of the at least one condensable constituent part, in particular tar. Because of the fact that the second cooling stage merely requires a mixing device for mixing the synthesis gas main flow with the recirculated cold synthesis gas, the occurrence of condensate in this cooling stage can be readily accepted since the risk of a deposition of condensate is low and admixing the recirculated, cold and cleaned synthesis gas additionally leads to a corresponding dilution, i.e. a reduction of the condensate proportion based on the total quantity of the synthesis gas.

The cold and cleaned synthesis gas which is recirculated is preferably obtained after it has passed through a gas scrubbing. In this connection, the invention is preferably further developed in such a manner that the third cooling stage and the separation step comprises the scrubbing of the synthesis gas in a gas scrubber.

The separation step can comprise a filtration for separating solid constituent parts, in particular in addition to the mentioned gas scrubbing. Preferentially, the filtration is arranged upstream of the gas scrubbing.

Preferably it is provided that the synthesis gas in the first cooling stage is cooled to a temperature of >280° C. This is a temperature range in which for example tar does not yet condensate or merely to a minor degree.

The preferred procedure is that the synthesis gas in the second cooling stage is cooled to a temperature of ≤200° C., in particular 150-200° C., i.e. to a temperature at which for example tar condensates.

In the third cooling stage, the synthesis gas is preferentially cooled to a temperature of 20-70° C.

A temperature regulation according to a preferred embodiment succeeds in that the recirculated synthesis gas quantity is regulated as a function of measurement values of a temperature sensor arranged between the second and the third cooling stage. The temperature sensor thus measures the temperature of the synthesis gas after the second cooling stage (actual value), compares this value with the respective desired set point value, wherein as a function of the differential between set point and actual value, the quantity of the recirculated cold synthesis gas is either increased or reduced.

According to a further aspect, the present invention relates to a device for carrying out the method according to the invention, comprising a first cooling device for the first cooling stage, a second cooling stage, a third cooling device for the third cooling stage and at least one separation device for the separation step arranged downstream of the second cooling stage in flow direction of the synthesis gas. The device is substantially characterized in that the second cooling stage comprises a recirculation line for recirculating a part quantity of synthesis gas branched off after the third cooling stage and after the at least one separation device, into the synthesis gas flow.

A preferred embodiment of the device provides that the first cooling device comprises at least one, preferably two heat exchangers that can be flowed through one after the other. The heat exchanger in this case can be formed by a tubular fume cooler.

The third cooling device and the separation device advantageously comprise a gas scrubber. The separation device can additionally comprise a filter for separating solid constituent parts.

In the following, the invention is explained in more detail by way of an exemplary embodiment schematically shown in the drawing.

Figure 1:
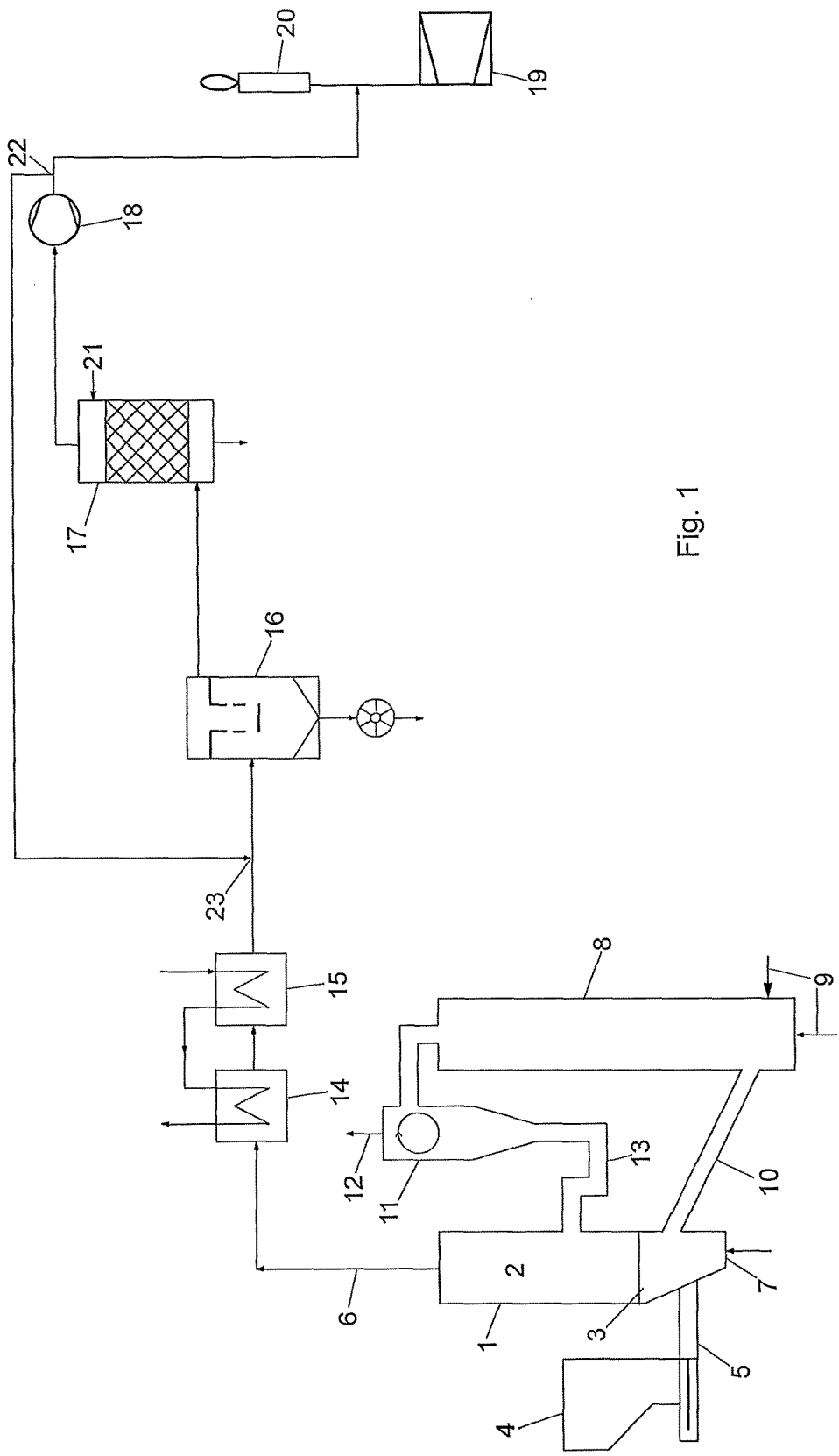
FIG. 1 shows a flow diagram of a plant for the gasification of biomass insofar as it is significant for the explanation of the present invention.

The gasification takes place in a double fluidized bed gasifier of the type described in AT 405 937 B. The double fluidized bed gasifier comprises a gasification reactor 1 with a gasification zone 2 for receiving a fluidized bed 3. The gasification reactor 1 is supplied with biomass for example in the form of wood chips. The supply is effected from a charge container 4 by means of a conveying device 5, for example a screw or piston conveyor. In the gasification reactor 1, the gasification of the employed biomass takes place at atmospheric pressure and temperatures of approximately 850° C. largely under the exclusion of oxygen. The gasification reactor 1 has a nozzle base 7 for injecting in particular steam or $CO_2$ and a gas discharge 6 for discharging the synthesis gas being created in the gasification zone 2. Injecting steam and/or $CO_2$ ensures the circulation of the fluidized bed 3 and thus the even heating of the fuel.

The double fluidized bed gasifier furthermore comprises a combustion chamber 8 for receiving a fluidized bed, in which at 9 air is injected. The gasification reactor 1 and the combustion chamber 8 are connected to one another in the base region by a lock-type device 10, so that the degasified and part-gasified fuel sinking downwards in the gasification reactor 1 can enter the combustion chamber 8 jointly with the bed material. In the combustion chamber 8, a combustion of the fuel supplied via the lock-type device 10 takes place, as a result of which the temperature of the fluidized bed of the combustion chamber 8 rises. The bed material is separated from the exhaust gas in a cyclone 11. The exhaust gas is discharged at 12 and where appropriate fed to an exhaust gas treatment. The bed material is conducted via a siphon 13 back into the gasification reactor 1 where it brings about the heat input.

The bed material can for example consist of olivine and ash, which circulates in the circuit through the gasification reactor 1 and the combustion chamber 8. The two fluidized bed systems of the gasification reactor 1 and of the combustion chamber 8 are thus connected by a bed material circuit, wherein the gas exchange is prevented by the siphon 13.

The hot, dust and tar-containing synthesis gas is initially cooled down in the heat exchangers 14 and 15 so far that the tar does not yet condensate, as a result of which deposits in the heat exchanger 15 are prevented. Following this, the dust-like constituent parts are separated in a fabric filter 16. The main proportion of the tar contaminations is then removed in the gas scrubber 17 and the synthesis gas, following compression by means of the blower 18, can be directly converted into electricity in a gas engine 19. Excess synthesis gas is fed to a gas flue 20. Biodiesel can be used for example as washing medium for the gas scrubber 17, which is fed to the gas scrubber at 21 and in which the tar constituent parts dissolve favourably.

A part quantity of the cleaned and cooled synthesis gas is branched off at 22 and recirculated to the synthesis gas flow at 23, i.e. between the heat exchanger 15 and the fabric filter 16. Because of the mixing of the synthesis gas coming from the heat exchanger 15 with the recirculated synthesis gas, a cooling is achieved which, where appropriate, leads to a condensation of the tar constituent parts.

Figure 2:
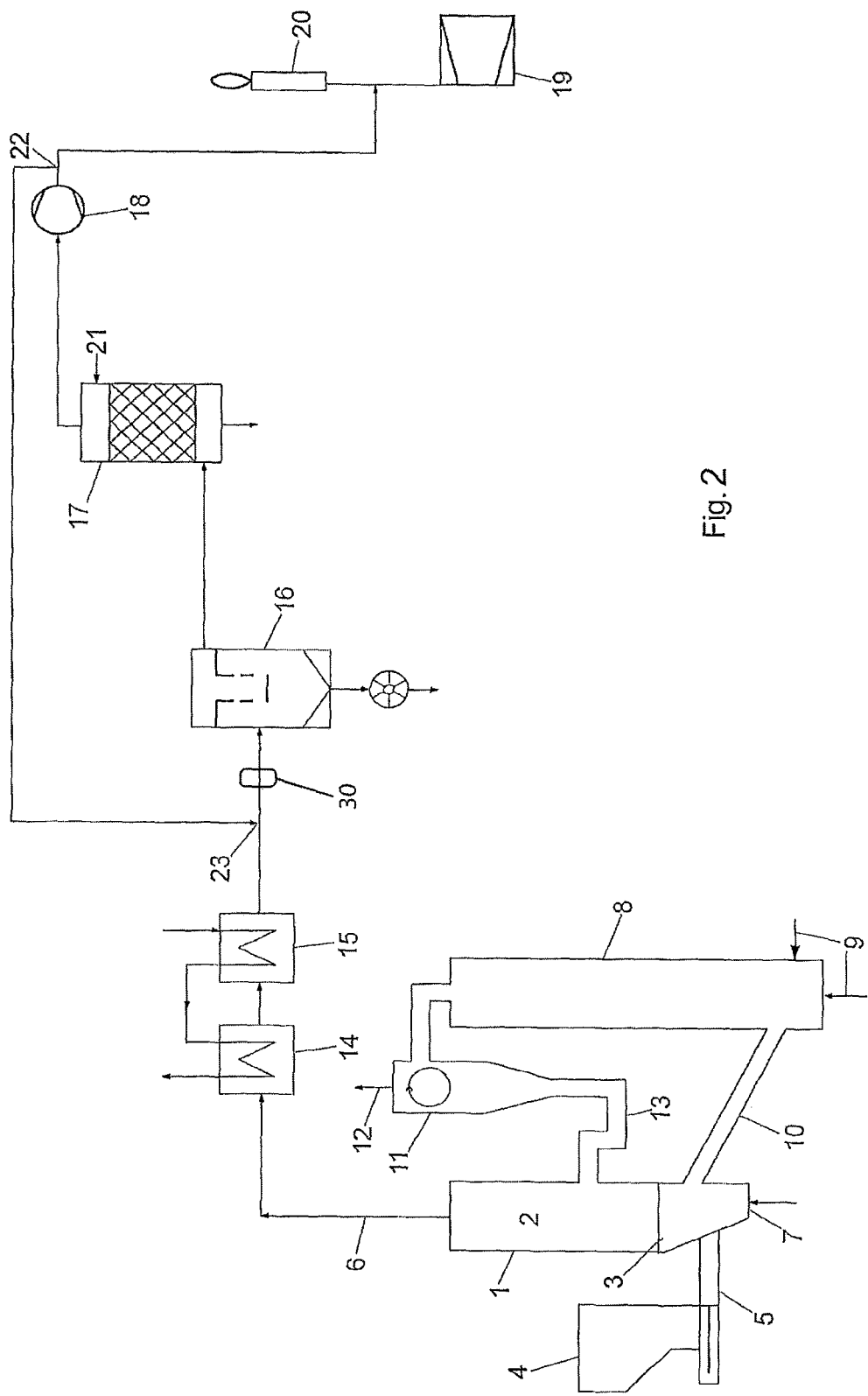
FIG. 2 shows a flow diagram of a plant insofar as significant with a temperature sensor for the explanation of the present invention.

In an embodiment shown in FIG. 2, temperature sensor 30 is for measuring the synthesis gas temperature.

Thus, a total of three cooling stages are realised. In the first cooling stage, the synthesis gas is cooled in the heat exchangers 14 and 15 from more than 800° C. to approximately 250-300° C. The second cooling stage is achieved by mixing the synthesis gas with the synthesis gas quantity recirculated at 23, wherein this quenching process causes a cooling down of the synthesis gas to 150-200° C. In the third cooling stage, the synthesis gas is cooled in the gas scrubber 17 to approximately 20-60° C.

The invention claimed is:

1. A method for cooling a hot synthesis gas containing at least one condensable constituent part comprising tar, wherein said method comprises passing the synthesis gas in a multi-stage cooling process sequentially through cooling steps one after the other, wherein said method comprises
    a first cooling step, wherein the synthesis gas passes through a first cooling stage, in which the synthesis gas is cooled down to a temperature of >280° C., which is above the condensation temperature of tar, whereby the synthesis gas comprises tar in its uncondensed form,
    a second cooling step wherein, the synthesis gas passes through a second cooling stage, in which the synthesis gas is cooled to a temperature of 150-200° C., which is below the condensation temperature of tar, and
    a third cooling step, wherein the synthesis gas passes through a third cooling stage, in which the synthesis gas is cooled to a temperature of 20-70° C.,
    wherein tar is condensed in the second and/or third cooling steps, and
    subjecting the synthesis gas to at least one separation step for separating the condensed tar from the synthesis gas during or after the third cooling step,
    wherein the second cooling stage comprises the recirculation of a part quantity of synthesis gas branched off after the third cooling stage and after the at least one separation step, into the synthesis gas flow.

2. The method according to claim 1, wherein the synthesis gas in the first cooling stage is conducted through at least one heat exchanger.

3. The method according to claim 1, wherein the third cooling stage and the separation step comprises the scrubbing of the synthesis gas in a gas scrubber.

4. The method according to claim 1, wherein the separation step comprises a filtration for separating solid constituent parts.

5. The method according to claim 2, wherein the synthesis gas in the first cooling stage is conducted sequentially through two heat exchangers.

6. A method for cooling a hot synthesis gas containing at least one condensable constituent part that comprises tar, said method comprising
    passing the synthesis gas sequentially through a multi-stage cooling process comprising a first cooling stage, a second cooling stage and a third cooling stage,
    measuring temperature values of the synthesis gas flow between the second cooling stage and the third cooling stage,
    branching off a quantity of the synthesis gas that has been cooled after passing through the third cooling stage, and
    recirculating at least a portion of the branched off synthesis gas to the synthesis gas that flows from the first cooling stage thereby forming said second cooling stage, and
    regulating the quantity of synthesis gas recirculated to the synthesis gas flow in the second cooling stage as a function of the measured temperature values of the synthesis gas between the second cooling stage and the third cooling stage,
    wherein
    in the first cooling stage the synthesis gas sequentially passes through heat exchangers whereby the synthesis gas is cooled down to a temperature that is >280° C., which is above the condensation temperature of the at least one condensable constituent part,
    in the second cooling stage synthesis gas from the first cooling stage is cooled down to ≤200° C., which is a temperature below the condensation temperature of the at least one condensable constituent part, and
    in the third cooling stage synthesis gas from the second cooling stage is subjected to a separation step for separating out the at least one condensable constituent part and is cooled down to a temperature of 20-70° C.

7. The method according to claim 6, wherein, after the second cooling stage and before the third cooling stage, the method further comprises filtering the synthesis gas from the second cooling stage to remove solid particles that may be in the synthesis gas.

8. The method according to claim 6, wherein in the second cooling stage synthesis gas from the first cooling stage is cooled down to 150-200° C.

9. The method according to claim 6, wherein, in said third cooling stage, said separation step comprises scrubbing the synthesis gas before recirculating the branched off synthesis gas from the third cooling stage to the second cooling stage.

10. The method according to claim 1, wherein said separation step includes filtering the synthesis gas to remove solid particles that may be in the synthesis gas and scrubbing the filtered synthesis gas before recirculating synthesis gas from the third cooling step to the second cooling stage.

11. A method for cooling a hot synthesis gas containing at least one condensable constituent part comprising tar, wherein said method comprises passing the synthesis gas in a multi-stage cooling process passes through a first cooling stage, a second cooling stage and a third cooling stage one after the other and, after an at least partial cooling, subjecting the synthesis gas to at least one separation step for separating the at least one condensable constituent part, wherein the synthesis gas in the first cooling stage is cooled down to a temperature above the condensation temperature of the at least one condensable constituent part and wherein the synthesis gas in the first cooling stage is conducted through at least one heat exchanger, in the second cooling stage the synthesis gas is cooled to a temperature below the condensation temperature of the at least one condensable constituent part that is ≤200° C., and the second cooling stage comprises the recirculation of a portion of synthesis gas branched off after the third cooling stage and after the at least one separation step, into the synthesis gas flow, wherein the quantity of recirculated synthesis gas is regulated as a function of measurement values of a temperature sensor arranged between the second and the third cooling stage.

12. The method according to claim 11, wherein the synthesis gas is cooled down to a temperature of >280° C. in the first cooling stage.

13. The method according to claim 11, wherein the synthesis gas is cooled down to a temperature of 150-200° C. in the second cooling stage.

14. The method according to claim 11, wherein the synthesis gas is cooled down to a temperature of 20-70° C. in the third cooling stage.

* * * * *